United States Patent [19]
Ohanian et al.

[11] Patent Number: 6,109,526
[45] Date of Patent: Aug. 29, 2000

[54] OPTICAL AND PASSIVE ELECTROMAGNETIC READER FOR READING MACHINE-READABLE SYMBOLS, SUCH AS BAR CODES, AND READING WIRELESS TAGS, SUCH AS RADIO FREQUENCY TAGS, AND CORRESPONDING METHOD

[75] Inventors: Michael Ohanian, Everett; Pavel Maltseff, Edmonds, both of Wash.

[73] Assignee: Intermec IP Corp., Beverly Hills, Calif.

[21] Appl. No.: 09/193,281

[22] Filed: Nov. 17, 1998

[51] Int. Cl.[7] ........................................... G06K 7/10
[52] U.S. Cl. ................. 235/462.45; 235/375; 235/385; 235/492; 342/27; 342/44; 342/51
[58] Field of Search .......................... 235/462.45, 462.1, 235/462.46, 375, 383, 384, 385, 472.01, 472.02, 487, 492, 493; 342/44, 51, 27

[56] References Cited

U.S. PATENT DOCUMENTS

| | | | |
|---|---|---|---|
| 5,204,681 | 4/1993 | Greene | 342/51 |
| 5,291,205 | 3/1994 | Greene | 342/44 |
| 5,424,524 | 6/1995 | Ruppert et al. | 235/383 X |
| 5,536,924 | 7/1996 | Ackley | 235/454 |
| 5,581,257 | 12/1996 | Greene et al. | 342/51 |
| 5,659,431 | 8/1997 | Ackley | 235/439 X |
| 5,962,834 | 10/1999 | Markman | 235/385 |
| 5,972,156 | 10/1999 | Brady et al. | 156/280 |

*Primary Examiner*—Michael G Lee
*Attorney, Agent, or Firm*—Perkins Coie LLP

[57] ABSTRACT

A document or object includes resonant tags, such as thin dipoles, and a machine-readable symbol, such as an area symbol, secured thereto. A reader reads the symbol and determines response characteristics encoded therein for the dipoles. The reader then can interrogate the dipoles and, together with the response characteristics and determined orientation (derived from the symbol), accurately determine resonant response characteristics received from the dipoles. Alternatively, a printer may interrogate the document to determine the response characteristics of the dipoles in the document, and then print the corresponding symbol.

26 Claims, 4 Drawing Sheets

OPTICAL AND PASSIVE ELECTROMAGNETIC READER FOR READING MACHINE-READABLE SYMBOLS, SUCH AS BAR CODES, AND READING WIRELESS TAGS, SUCH AS RADIO FREQUENCY TAGS, AND CORRESPONDING METHOD

TECHNICAL FIELD

The invention relates generally to input devices, such as devices for reading bar codes and other machine-readable symbols, as well as remotely readable devices, such as radio frequency (RF) tag devices.

BACKGROUND OF THE INVENTION

Information associated with objects is typically collected using information carrying devices affixed to the objects. Information carrying devices include bar code symbols or other optically read symbols. A laser scanner, optical imager or other device scans or images the bar code symbol and decodes information encoded within the symbol.

One disadvantage of bar code symbols is that they may not be altered once printed. For example, if a bar code symbol encodes information about objects contained within a box, and then one of the objects is removed from the box, the bar code symbol may not be updated. Instead, a new bar code symbol must be printed and affixed to the box. Another disadvantage of bar code symbols is that they typically must be visible to the scanner or imager. If they are obscured (e.g., within a box), the scanner/imager may not read the symbol.

Radio frequency (RF) tags overcome these limitations of bar code symbols. Certain RF tags may be electronically rewritten with data, thereby overcoming the permanency of bar code symbols. Additionally, RF tags may be interrogated or polled through opaque surfaces, such as through boxes, to exchange data therewith.

One shortcoming of RF tags, however, is that they are expensive to manufacture. Often, RF tags are constructed using a small semiconductor chip with an associated antenna, both of which may be expensive to manufacture.

U.S. Pat. Nos. 5,204,681, 5,291,205, and 5,581,257 describe radio frequency automatic identification systems that overcome some shortcomings of RF tags. These patents describe radio frequency automatic identification systems that initially detect targets having numerous radio frequency resonators, such as quartz crystals. The quartz crystals may be made by a process of heating quartz to soften it and cutting crystals of approximate size and resonant frequency. The resonators are then produced by a process where resonance is measured to determine actual resonant frequency, and then the crystals are sorted based on certain predetermined frequency windows. The resonators may then be incorporated into a variety of objects, such as in paper. Information is attributed to the target (e.g., the paper), under the RF response characteristics of the target, such as the resonant frequencies of the resonators present, and/or the spatial locations of the resonators within the target.

In addition to quartz crystals, thin dipoles may be employed, which may be metallizations on a plastic film substrate. Information may be attributed to a target by fabricating the target with the resonators disposed at locations to encode information under a predetermined encoding system. Readers then read the radio frequency response characteristics of a target in a field near thereto of a radiating aperture that is activated by a radio frequency source.

SUMMARY OF THE INVENTION

One problem with employing RF identification systems, and in particular, thin dipoles, is that the orientation of the dipoles significantly affects the received signals. Thus, the orientation of the dipoles with respect to an object to which they are affixed must be determined when reading or polling such dipoles. A 10° change in orientation of a RF reader with respect to dipoles equals a significantly change in both amplitude and phase of received signals.

In a broad sense, the present invention embodies a data input apparatus that obtains information relative to a target. The apparatus includes a processor, a wireless data receiver, and an associated data capture engine. The wireless data receiver is coupled to the processor and receives electromagnetic data from at least one resonator, such as a dipole, positioned relative to the target. The data capture engine is also coupled to the processor and receives data from an associated data carrier, such as a machine-readable symbol. The associated data carrier is positioned relative to the target and stores resonator characteristic data versus position for the resonator. The processor is programmed to determine an orientation of the associated data carrier or target, interpret the data received from the associated data carrier to obtain at least the response characteristic data, process the received electromagnetic data, and correlate the response characteristic data with the received electromagnetic data.

Embodiments of the invention also include a printer for printing an associated data carrier relative to the resonator. Additionally, embodiments of the invention include an article of manufacture, such as a document or object, that contain both an associated data carrier and at least one resonator.

BRIEF DESCRIPTION OF THE DRAWINGS

In the drawings, like reference numerals refer to similar elements or steps. Additionally, the most significantly digit in a reference numeral refers to the figure number in which that element is first introduced and discussed (e.g., element 204 is first introduced in FIG. 2).

DETAILED DESCRIPTION OF THE INVENTION

A data storage technique, corresponding reading apparatus, and methods therefor, are described in detail below. In the following description, numerous specific details are provided, such as specific wireless transmitters, machine-readable symbols, interrogating and reading apparatus, etc., to provide a thorough understanding of the invention. One skilled in the relevant art will readily recognize that the invention may be practiced without one or more of the specific details, or with other transmitters, symbols, apparatus, etc. In other instances, well-known structures or operations are not shown or described in detail to avoid obscuring aspects of the invention.

Figure 1:
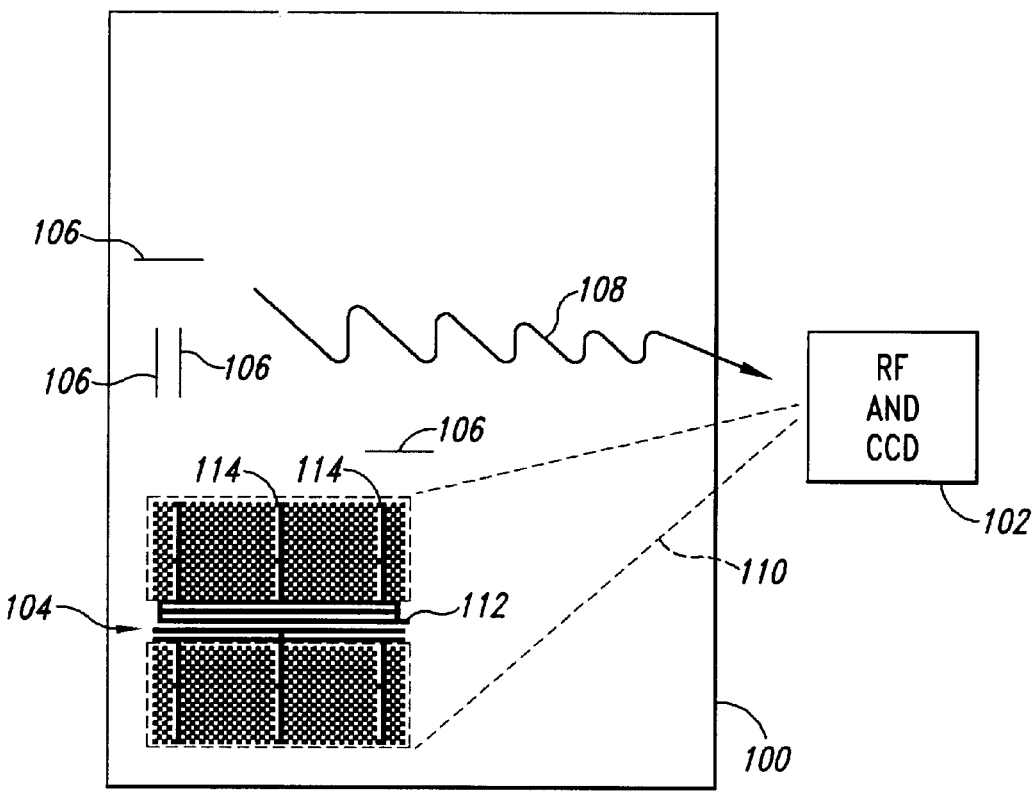
FIG. 1 is a partial schematic, partial block diagram of a document containing several thin dipoles and a two-dimensional symbol, and a reader for reading the dipoles and symbol.

Referring to FIG. 1, data from a document 100 under an illustrated embodiment of the invention is read, scanned, or is otherwise collected therefrom using a reader 102. The document 100 includes a two-dimensional data collection symbol 104 and one or more RF or wireless transmitting elements, such as thin dipoles 106. The reader 102 emits RF energy to activate the dipoles, receives RF signals 108 from the dipoles 106, and captures an image 110 of the symbol 104. The symbol 104 may be any linear, stacked, area, or other machine-readable symbol. In the illustrated embodiment, the symbol 104 is a Code One area symbol that employs a matrix of data cells rather than one or more rows of bars and spaces. Other area symbologies include Maxicode, Data Matrix, etc. The reader 102 may determine a location and orientation of the symbol 104 from a central finder pattern 112 and elongated members 114 that extend perpendicularly from the central pattern. Importantly, the reader 102 determines an orientation of the document 100 based on the determined orientation of the symbol 104.

The dipoles 106 may be elongated metal, metallized articles, such as metal-coated fibers, or hybrids. The dipoles may have a diameter of 0.001 inch and a length of 0.25 inch or longer. The dipoles 106 are resonant at at least one predetermined or selected frequency $F_n$ based on, among other factors, their length. Thin metal dipoles as resonators are known in the art. Other resonators are also known in the art, such as quartz, gallium, etc.

Figure 2:
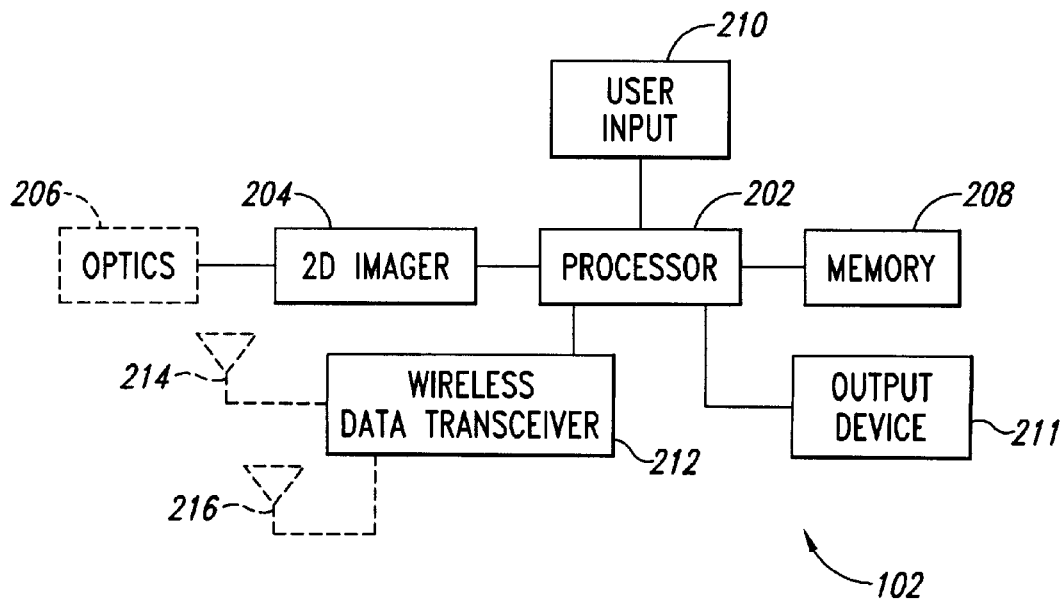
FIG. 2 is a block diagram of the reader of FIG. 1.

Referring to FIG. 2, the reader 102 includes a processor 104 coupled to a data capture engine, such as a two-dimensional imager 204. The two-dimensional images captures a two-dimensional image using, for example, a two-dimensional charge-coupled device (CCD) having a square or rectangular active surface of light-sensitive elements. The array of elements of the two-dimensional CCD defines a field of view of the two-dimensional imager 102. Other known image capture or light-sensitive devices may be used, such as vidicons, two-dimensional semiconductor arrays, active pixel sensors (APS) or a linear CCD array having mechanical means to pivot the array or object being imaged to provide resolution in an axis perpendicular to the linear axis of the array. Of course, many other image capture devices may be used. Appropriate conventional focusing or light-gathering optics 206, electronics and/or a light source (not shown) may be provided for use with the two-dimensional imager 204. Details regarding two-dimensional image capture devices may be found, for example, in U.S. Pat. No. 5,536,924, entitled "Method and Apparatus for Matrix Symbology Imager," and U.S. Pat. No. 5,659,431, entitled "Fixed Mount Image Using Optical Module for Reading One-or Two-Dimensional Symbology Data."

As is known, each pixel element in the CCD array of a two-dimensional imager 204 outputs a varying level signal, e.g., an analog signal that determines the intensity of light impinging upon the particular light-sensitive element. In the illustrated embodiment, the CCD array in the two-dimensional imager 204 outputs a grey level signal; however, the two-dimensional imager in an alternative embodiment produces a multilevel color signal. The signal's output from the CCD array are similar to video data or analog signals, and the two-dimensional imager 204 may digitize the signals for input to the processor 202. Alternatively, the processor 202 may include an analog-to-digital converter to convert the grey level analog signals to digital signals. While the exemplary embodiment employs the two-dimensional imager 204, those skilled in the art will readily recognize that other image sampling or capture devices may be employed under principles of the invention, such as laser or scanners, pen-based scanners, etc.

The processor 202 may include a high speed clock (not shown) so that the processor, two-dimensional imager 204 and other components may operate at high speed. While the exemplary embodiment employs a single processor 202, those skilled in the relevant art will recognize that the reader 102 may employ multiple processors that divide tasks or routines noted below.

A memory 208, coupled to the processor 202, stores digital signals output from the processor. The memory 208 preferably includes both volatile and non-volatile memory (e.g., random access and electronically erasable read-only memory). An object or image within the field of view of the two-dimensional imager 204 is converted into electrical signals that are digitized and stored in the memory 208 to be retrieved and processed by the processor 202 under routines described below. For example, the document 100 may include not only the symbol 104, but an image of a person, and alphanumeric text. The reader 102 may image and store a digital image of not only the symbol 104, but of the document 100 in the memory 208 for later processing by the processor 202. Rather than first being processed by the processor 202, signals output from the two-dimensional imager 204 may be directly input to the memory 208 using known techniques, such as direct memory access (DMA). As used herein, the term "stored image" generally refers to an image from the field of view stored in the memory 208, which contains an image of a document to be read or object to be analyzed.

The term "processor" as used herein generally refers to any logic processing unit, such as one or more central processing units (CPUs), digital signal processors (DSPs), application-specific integrated circuits (ASIC), etc. While the processor 202, two-dimensional imager 204, memory 208 and other elements of the reader 102 are shown as separate blocks, some or all of these blocks may be monolithically integrated into a single chip.

The reader 102 may be a fixed mount device, or a hand held device with an appropriate housing enclosing much of the components. The reader 102 may include a trigger switch, shown as a user input 210. Alternatively, or in addition to the trigger, the user input 210 may include a keyboard, touch-sensitive display, trackball, or other input device for permitting a user to input signals to the processor 202. By activating the trigger switch, the processor 202 causes the two-dimensional imager 204 to provide image signals to the processor 202 that constitute an instantaneous image or scan within the field of view of the imager. The specific means and methods for storing an image of a document by the reader 102 are conventional and will be understood by those skilled in the relevant art without any further description.

In addition to the user input 210, the reader 102 includes one or more output devices 211, such as visual display devices. The output device 211 may provide data to the user of the reader 102, by displaying information such as information decoded from a machine-readable symbol. The output device 211 may include other components, such as a printer, output port for coupling the reader 102 to an external computer, a modem, wireless transceiver for communicating data between the reader and the external computer, etc. Additionally, the reader 102 may combine the user input 210 and output device 211 to provide a touch-sensitive display. Further details on data input devices and modules therefor that may be employed with the reader 102 are described in the inventors' co-pending U.S. application Ser. No. 09/085,532, entitled "Universal Data Input and Processing Device, Such As Universal Point-Of-Sale Device For Inputting and Processing Bar Code Symbols, Document Images, and Other Data," filed May 27, 1998.

As used generally herein, the term "document" refers generically to any object having data collected by the reader 102, such as visual information from which the two-dimensional imager 204 produces a stored image for processing by the processor 202. Examples of such documents include products having bar code information as well as alphanumeric text and/or images, as well as traditional documents such as lottery tickets, merchandise coupons, financial instruments (such as bank checks or drafts, stock and bond certificates, notes, security agreements, etc.), forms of identification (such as passports, drivers' licenses, food stamp identification cards, etc.), event or transportation tickets (such as airline or train tickets, concert or sporting event tickets, etc.), routing labels (such as shipping or expeditor's labels, postal stamps, etc.), cards (such as credit cards, etc.) etc. As used generally herein, the term "lottery tickets" refers generically to any gambling or gaming device, such as scratch lottery tickets, lottery tickets requiring one or more numbers to be selected from a larger set of numbers, pull tabs, raffle tickets, etc.

While the depicted embodiment shows the document 100, the present invention can be applied to numerous objects or targets. For example, the dipoles 106 can be embedded or fixed to an object, to which the symbol 104 is applied as an adhesive label. Additionally, the dipoles can be embedded with the label substrate, over which the symbol 104 is printed. Thereafter, the label can be affixed or applied to a target or object.

A wireless data transceiver 212 having an antenna 214 receives wireless signals from the dipoles 106. The wireless data transceiver 212 may also receive wireless electronic signals from various other sources, and input all of such received data to the processor 202, such as from RF tags. Wireless communications, including RF tags, are described, for example, in U.S. patent application Ser. No. 09/050,623, entitled "Wireless Line of Sight Communication System and Apparatus," filed Mar. 30, 1998, and assigned to the same assignee as this invention.

To activate or interrogate the dipoles 106, the wireless data receiver 212 may include a second antenna or directed RF emitter 216 through which the data transceiver 212 emits RF energy to activate the dipoles. The emitted energy may be emitted through a polarizer, and energy emitted from the dipoles 106 received by the wireless data transceiver 212 through another polarizer. Two or more polarizers may be employed, at different angles, to detect the dipoles 106 disposed at different angles within the document 100. The detection of one of the dipoles 106 is generally a cosine function of the dipole angle with respect to the polarization axis of the polarizer.

Figure 3:
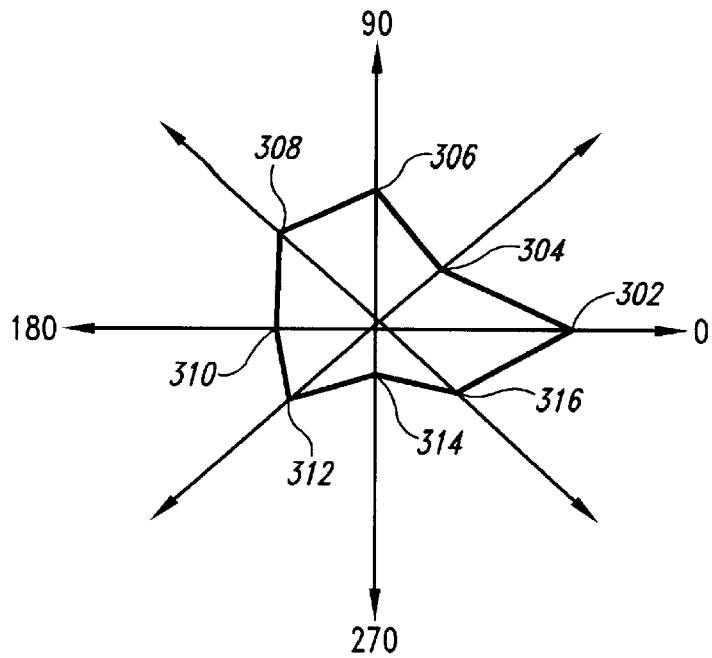
FIG. 3 is a plot of amplitude vs. rotational position for a given frequency $F_n$ for emissions received from the thin dipoles of FIG. 1.

Referring to FIG. 3, a graph of the amplitude of energy received from the dipoles 106 at a predetermined frequency $F_n$ is shown at angles 0 through 360° corresponding to 360° rotational orientation of the reader 102 with respect to the dipoles in the document 100. While the graph of FIG. 3 is only an example of amplitude versus orientation for dipoles (not necessarily those shown in FIG. 1), it shows how amplitude varies with the orientation of the reader 102. The response characteristics may well differ at different frequencies for the same document 100 and orientations of the reader 102.

The symbol 104 has encoded therein the response characteristics of the dipoles 106 in the document 100 based on various orientations of the reader. As noted above, the reader may determine the location and orientation of the symbol 104 with respect to the document 100. In the depicted embodiment, the symbol 104 is positioned at a selected orientation with respect to the document 100 in FIG. 1. For example, the finder pattern 112 is positioned parallel to a bottom edge of the document 100, while the elongated members 114 extend parallel to a side edge of the document. By determining an orientation of the symbol 104, the reader 102 can then determine an orientation of the document 100 with respect to the reader. The reader 104 may typically determine an orientation of the document 100 to an error of plus or minus three percent based on a determined orientation of the symbol 104. Thus, in addition to encoding response characteristics, the reader 102 may determine its orientation relative to the dipoles 106 based on the symbol 104.

the symbol 104 may need to encode only amplitude values at select orientations for a given frequency, such as at the points 302–316 shown in FIG. 3. The reader 104 may then extrapolate, within a reasonable margin of error, amplitude values between such points corresponding to orientations therebetween. Then, by combining the determined orientation and corresponding response characteristic encoded in the symbol 104, the reader 102 may apply such response characteristic to a signal received from one or more of the dipoles 106 to correlate data therebetween and accept data from the dipoles of the document 100. The symbol 104 may, of course, encode response characteristics of the dipoles 106 in the document 100 at more than one frequency. Additionally, the symbol 104 may encode phase variations based on position as response characteristic information for the dipoles 106.

If the dipoles 106 are positioned randomly within the document 100, the dipoles will exhibit somewhat unique resonant characteristics at at least one frequency $F_n$, at a selected orientation. Therefore, knowing the response characteristics based on orientation, from data encoded in the symbol 104, the reader 102 can correlate such data with electromagnetic data or resonant response energy received from the dipoles 106. If the response characteristic based on orientation and the received resonant response energy correlate to a selected value (e.g., a known stored value), the reader 102 may verify an authenticity of the document 100. The reader 102 can also verify that the symbol 104 is appropriately affixed to, and corresponds with, the document 100.

Figure 4:
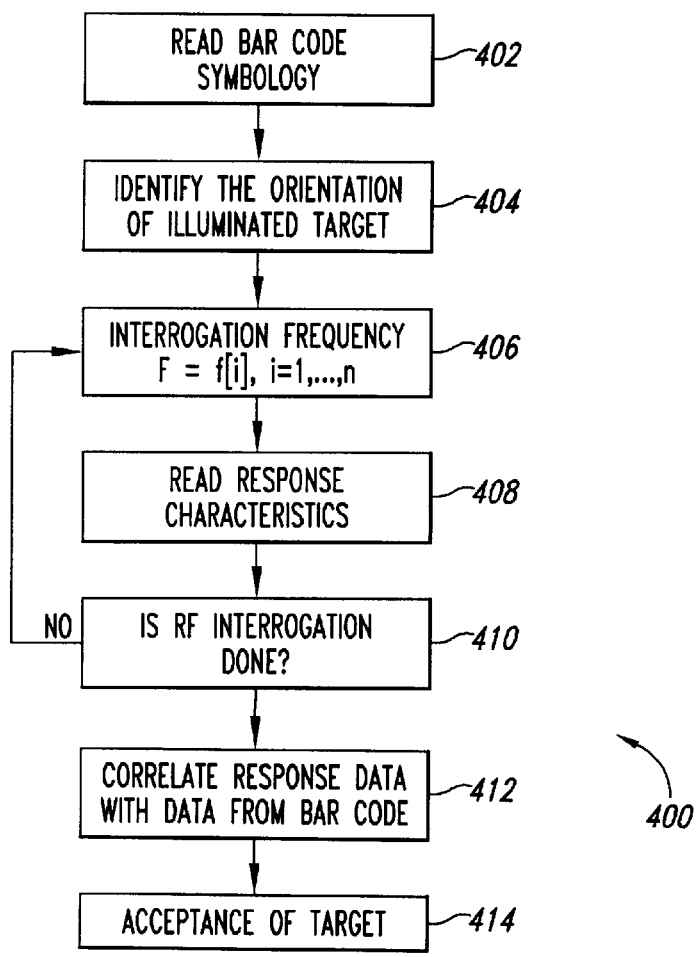
FIG. 4 is a flowchart showing steps under one embodiment for reading the dipoles and symbol from the document of FIG. 1.

Referring to FIG. 4, a flow chart of a routine 400 showing basic steps performed by the processor 202 for reading the document 100. Those skilled in the relevant art can create source code based on the flow chart of FIG. 4, and the detailed description provided herein. The software performing the steps of FIG. 4 is preferably stored in the memory 208, or can be stored in removable media, such as disks, or hardwired or preprogrammed in chips, such as PROM semiconductor chips.

In step 402, the reader 102 reads the symbol 104. In step 404, the processor 202 of the reader 102 identifies the orientation of a target, object, or in this example, the document 100, based on the determined orientation of the symbol 104. In step 406, the processor 202, via the wireless data transceiver 212, interrogates or otherwise excites the dipoles 106 of the document 100 at a first interrogation frequency. In step 408, the processor 202 reads the response characteristics from the one or more dipoles 106 in the document 100 that respond to and produce resonant response energy from the interrogation frequency. In step 410, the processor 202 determines if wireless or radio frequency (RF) interrogation is complete. If not, the processor again performs the steps 406–410 as the processor interrogates other dipoles at second, third and possibly more frequencies.

After the RF interrogation is completed in step 410, the processor 202 in step 412 correlates the received resonant response energy with the response characteristic data encoded in the symbol 104. If the data correlates, then in step 414 the processor 202 accepts the target or document 100. For example, if the received resonant response energy at several predetermined frequencies correspond to the appropriate response characteristics encoded in the symbol 104, at the reader's orientation relative to the document 100, the processor 202 verifies an authenticity of the document.

Figure 5:
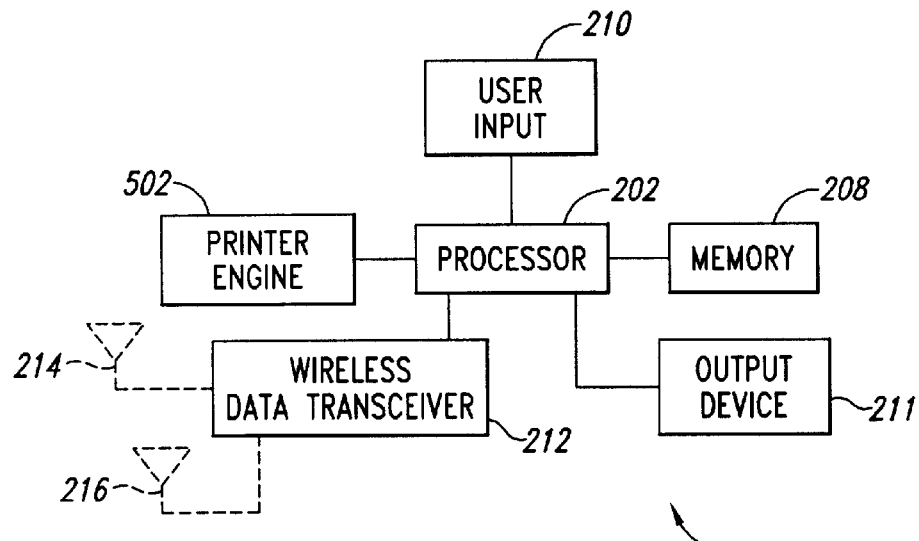
FIG. 5 is a block diagram of a printer.

Referring to FIG. 5, a printer 500 according to an alternative embodiment contains components similar to those of the reader 102 (FIG. 2). In general, this alternative embodiment and those described in this application are substantially at least similar to previously described embodiments, and common elements and steps are identified by the same reference numbers. Only significant differences in construction or operation are described in detail.

Referring to FIG. 5, the printer 500 includes a printer engine 502 that prints machine-readable symbols, such as the symbol 104. The printer engine 502 can be any known printer engine, such as thermographic, electrostatic, impact, etc. The printer 500 can print, via the printer engine 502, the symbol 104, which can then be applied to the document 100. Alternatively, the printer engine 502 can print the symbol 104 directly on the document 100. In the depicted embodiment, the printer 500 interrogates the dipoles 106 in the document 100 before printing the symbol 104, as described below.

Figure 6:
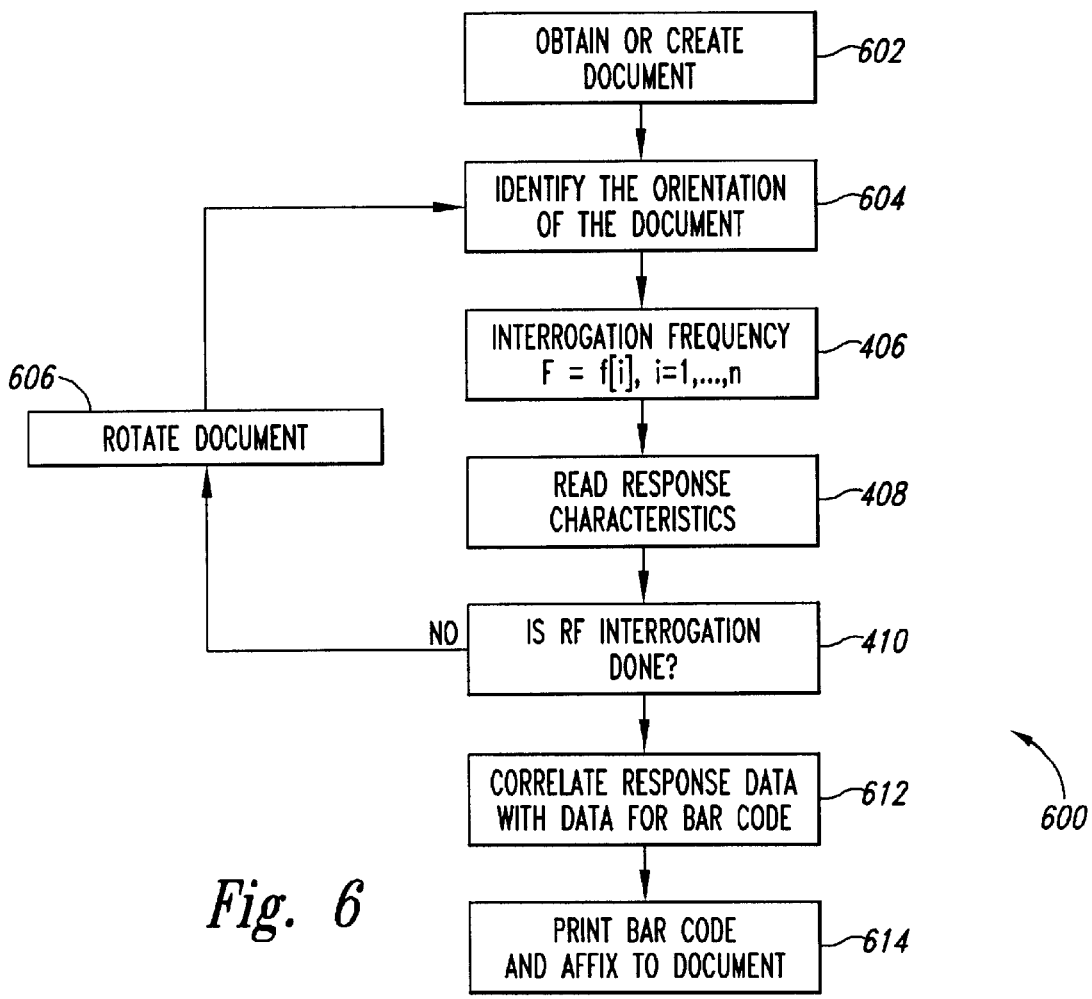
FIG. 6 is a flowchart showing steps under an embodiment for printing symbols for dipoles in a document or other object, such as the document of FIG. 1.

Referring to FIG. 6, the routine 600 performed by the printer 500 first obtains or creates the document 100, including the thin dipoles 106 (without the symbol 104). The processor 202 determines the orientation of the document 100 in step 604. In steps 406–410, the processor 202, via the wireless transceiver 212, determines the resonant response energy from the dipoles 106 in the document 100. If the RF interrogation is not completed in step 410, then in step 606, the document 100 or the antenna is rotated relative to the wireless data transceiver 212 of the printer 500. Thereafter, steps 604–410 are performed for the first frequency so that the printer 500 determines the response characteristics of the document 100, at the first frequency. For example, the printer 500 may interrogate the document 100 at the first frequency at eight rotational positions, to determine the eight response characteristics shown in FIG. 3.

The dipoles 106 may all have fixed sizes. As a result, the printer 500 need only interrogate them at a predetermined frequency, such as 20 gigahertz. Alternatively, particularly with resonators having differing excitation frequencies, the printer 500 may select a second frequency, and steps 604, 406, 408, 410 and 606 are again performed at the second frequency.

In step 612, the processor 202 correlates the received resonant response energy, at all the selected orientations of the document and the selected frequencies, with corresponding symbol data. In step 614, the processor 202 controls the printer engine 502 to print the symbol 104 with the appropriate response characteristic data as the symbol 104, either directly on the document 100, or on a label that is later affixed to the document.

Under the steps of the routine 600, the printer 500 of the depicted embodiment obtains the document 100 having the dipoles 106 previously positioned at random orientations within the document. With such random orientations, there may be over one in three billion chance of any two documents having the same or substantially similar resonant response energies. Alternatively, the document 100 can include the dipoles 106 at predetermined orientations and locations. As a result, the processor 202 need not perform steps 604, 406, 408, 410 and 606, since the processor 202 may know the response characteristics based on the known dipole response frequency, locations and orientations. Therefore, the printer 500 may simply print the symbol 104 with such predetermined response characteristics.

In another alternative embodiment, the printer 500 prints not only the symbol 104, but the dipoles 106. For example, the printer engine 502 can include a metallized or doped ink and thereby print the dipoles on the document 100 at either random or predetermined orientations and locations. Further details on printing electrical elements may be found, for example, in the assignee's copending U.S. patent application Ser. No. 09/082,427, entitled "Method and Apparatus for Making Electrical Traces, Circuits and Devices," filed May 20, 1998.

The printer 500, under the depicted embodiment, can create "RF barcodes" that provide some benefits of RF tags, in addition to all the benefits of machine-readable symbols. Such RF barcodes are considerably more inexpensive to manufacture than RF tags. Under the depicted embodiments, the symbol 104, in conjunction with the dipoles 106, may be applicable to authentication markets, such as currency, bank instruments, etc., where the document 100 can resist forgery.

Figure 7:
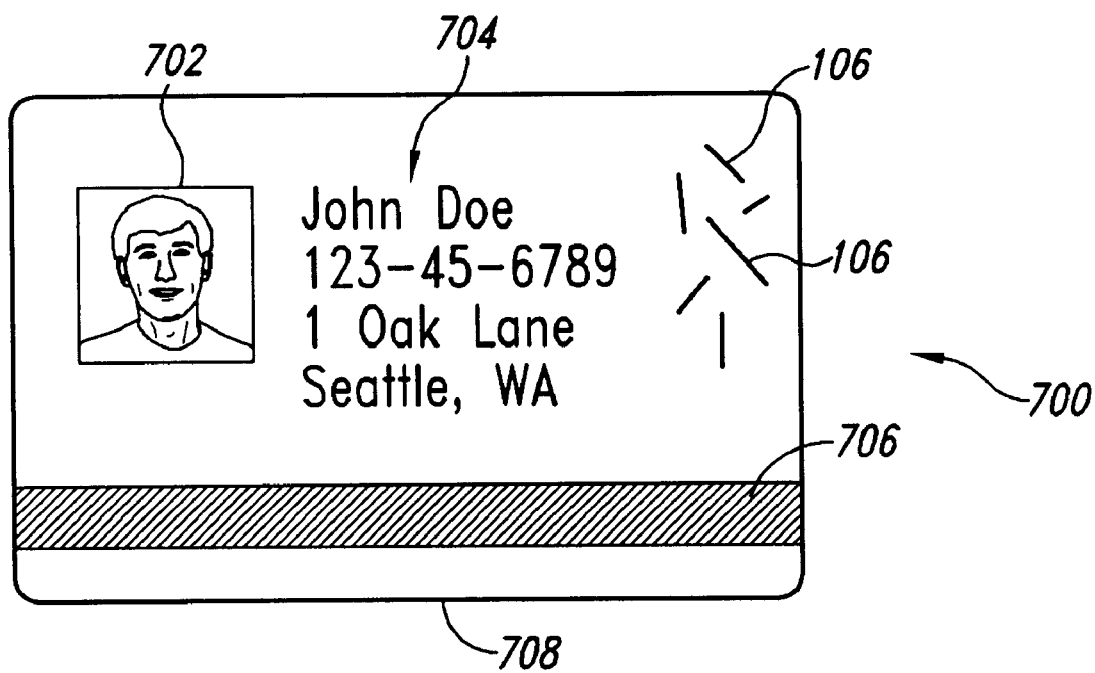
FIG. 7 is top plan view of a card employing dipoles and a magnetic stripe.

Referring to FIG. 7, an alternative embodiment to the document 100 is shown as a card 700. The card 700 includes a photograph 702 of an owner of the card, as well as the owner's name, address and social security number 704. Several of the dipoles 106 are positioned randomly within the card 700. Importantly, in lieu of the symbol 104, the card 700 includes a magnetic portion or stripe 706 that has encoded therein the response characteristics of the dipoles 106. Magnetic stripe technology is well known, such as in the credit card art. The magnetic stripe 702 can be read by numerous magnetic stripe readers. Since the magnetic stripe 706 is aligned with a lower edge 708 of the card 700, an orientation of the card may be determined by a card reader (not shown) when both decoding the data in the magnetic stripe 706, as well as interrogating the dipoles 106. The reader 102 can be readily modified to replace the imager 204 with a magnetic stripe reader for reading the reading the magnetic stripe 706. Additionally, the printer 500 can be readily modified to replace the printer engine 502 with a magnetic stripe encoder.

Although specific embodiments of, and examples for, the invention are described herein for illustrative purposes, various equivalent modifications are possible within the scope of the invention, as those skilled in the relevant art will recognize. The teachings provided herein of the invention may be applied to analyzing other objects or targets, not necessarily the exemplary document described above. For example, an object may have affixed thereto, or contained integral therewith, the dipoles 106. The symbol 104 may then be affixed to the object. Various other data input modules may be employed to provide greater data input sources for analysis by the processor 202.

All of the above U.S. patents and applications are incorporated by reference. Aspects of these U.S. patents and applications may be employed with the teachings of the invention to provide further combinations.

These and other changes may be made to the invention in light of the above detailed description. In general, in the following claims, the terms used should not be construed to limit the invention to the specific embodiments disclosed in the specification and the claims, but should be construed to include all data input systems and methods that operate under the claims to provide methods for inputting and analyzing data. Accordingly, the invention is not limited by the disclosure, but instead its scope is to be determined entirely by the following claims.

We claim:

1. A data input apparatus that obtains information relative to an object, the apparatus comprising:

a processor;

a two-dimensional image capture device coupled to the processor;

a memory coupled to the processor and storing an image of at least an image of a two-dimensional machine-readable symbol on the object, and wherein the two-dimensional machine-readable symbol stores data corresponding to response characteristic information versus position for at least one resonator secured to the object;

a wireless data transceiver coupled to the processor, wherein the wireless data transceiver transmits an energizing signal to, and receives electromagnetic data received from, the at least one resonator secured to the document; and wherein the memory stores instructions for the processor for (a) determining an orientation and decoding the image of the two-dimensional machine-readable symbol to obtain at least the response characteristic information, (b) processing the received electromagnetic data, and (c) correlating the response characteristics with the received electromagnetic data.

2. The apparatus of claim 1 wherein the object is a document, wherein the two-dimensional machine-readable symbol is positioned at a selected orientation on the document and includes an area symbol selected from an area symbology, wherein the area symbol stores phase response characteristic information and amplitude response characteristic information for at least two selected frequencies, wherein the at least one resonator includes a plurality of thin dipoles positioned about the document, wherein at least two of the thin dipoles provide an energizing signal corresponding to the two frequencies, respectively, and wherein the apparatus further includes a hand-held housing that at least partially encloses the processor, two-dimensional image capture device, memory and wireless data transceiver.

3. The apparatus of claim 1 wherein the object is a label, wherein the two-dimensional machine-readable symbol is positioned at a selected orientation on the object, relative to the label, and includes an area symbol selected from an area symbology, wherein the area symbol stores amplitude response characteristic information for at least two frequencies, wherein the at least one resonator includes a plurality of thin dipoles positioned in the label, and wherein at least two of the thin dipoles provides an energizing signal corresponding to the two frequencies, respectively.

4. The apparatus of claim 1 wherein the two-dimensional machine-readable symbol is positioned at a selected orientation on the object and is an area symbol selected from an area symbology, wherein the area symbol stores response characteristic information for a selected frequency, wherein the at least one resonator includes a plurality of thin dipoles positioned about the object, and wherein at least one of the thin dipoles provides an energizing signal corresponding to the selected frequency.

5. The apparatus of claim 1, further comprising a keyboard and a display device coupled to the processor, wherein the keyboard receives user input and the display device outputs data, and wherein the apparatus further includes a hand-held housing that at least partially encloses the processor, two-dimensional image capture device, memory, wireless data transceiver, keyboard and display device.

6. A data input apparatus that obtains information relative to a target, the apparatus comprising:

a processor;

a wireless data receiver coupled to the processor, wherein the wireless data receiver receives electromagnetic data received from at least one resonator positioned relative to the target;

an associated data capture engine having a two-dimensional image capture device and being coupled to the processor that receives data from an associated data carrier, including a machine-readable symbol, positioned relative to the target, and wherein the data carrier stores resonator characteristic data versus position for the at least one resonator positioned relative to the target; and wherein the processor is programmed to determine an orientation of the associated data carrier or target, interpret the data received from the associated data carrier to obtain at least the response characteristic data, process the received electromagnetic data, and correlate the response characteristic data with the received electromagnetic data.

7. The apparatus of claim 6 wherein the target is a document, wherein the machine-readable symbol positioned at a selected orientation on the document, wherein the symbol encodes data in two perpendicular dimension, wherein the symbol stores amplitude response characteristic information for at least two selected frequencies and phase response characteristic information, and wherein the associated data capture engine includes a symbol reader engine, and wherein the at least one resonator includes a plurality of thin dipoles positioned relative to the document, wherein at least two of the thin dipoles provide an energizing signal corresponding to the two selected frequencies, respectively, wherein the wireless data receiver includes a transmitter that transmits an energizing signal to the at least two resonators, and wherein the apparatus further includes a hand-held housing that at least partially encloses the processor, associated data capture engine, and wireless data transceiver.

8. The apparatus of claim 6 wherein the target is a label, wherein the machine-readable symbol positioned at a selected orientation on the object, relative to the label, wherein the symbol stores amplitude or phase response characteristic information for at least one frequency, wherein the associated data capture engine includes a symbol reader engine, wherein the at least one resonator includes a plurality of thin dipoles positioned in the label, and wherein at least one of the thin dipoles provides an energizing signal corresponding to the one frequency.

9. The apparatus of claim 6 wherein the machine-readable symbol is selected from an area symbology, wherein the symbol stores response characteristic information for a selected frequency, and wherein the at least one resonator provides an energizing signal corresponding to the selected frequency.

10. The apparatus of claim 6, further comprising a keyboard and a display device coupled to the processor, wherein the keyboard receives user input and the display device outputs data, and wherein the apparatus further includes a hand-held housing that at least partially encloses the processor, associated data capture engine, wireless data receiver, keyboard and display device.

11. The apparatus of claim 6, further comprising a touch-sensitive display device, coupled to the processor, which receives user input and displays data, and wherein the apparatus further includes a hand-held housing that at least partially encloses the processor, associated data capture engine, wireless data receiver, touch-sensitive display device.

12. The apparatus of claim 6, further comprising an output device, coupled to the processor, that outputs data to an external computer, wherein the output device is a cable port or wireless transmitter.

13. The apparatus of claim 6 wherein the associated data carrier includes a magnetically encoded portion secured to the target, wherein the magnetically encoded portion stores response characteristic information for a selected frequency, wherein the at least one resonator provides an energizing signal corresponding to the selected frequency, and wherein the associated data capture engine is a magnetic code reader for reading the magnetically encoded portion.

14. A data output apparatus that provides information relative to a target, the apparatus comprising:
   a processor;
   an associated data output engine coupled to the processor that produces an associated data carrier for positioning relative to the target, wherein the associated data carrier includes a machine-readable symbol for being read by a two-dimensional image capture device, and stores resonator characteristic data versus position for at least one resonator positioned relative to the target, and wherein the resonator characteristic data may be automatically received; and
   wherein the processor is programmed to receive information of an orientation of the associated data carrier or target and a corresponding response characteristic of the at least one resonator and instruct the associated data output engine to produce the associated data carrier that stores the resonator characteristic data versus position for the at least one resonator, process the received electromagnetic data, and correlate the response characteristic data with the received electromagnetic data.

15. The apparatus of claim 12 wherein the target is a document, wherein the machine-readable symbol positioned at a selected orientation on the document, wherein the symbol encodes data in two perpendicular dimension, wherein the symbol stores amplitude response characteristic information for at least one selected frequency, and wherein the apparatus further includes a wireless data receiver coupled to the processor, wherein the wireless data receiver receives the corresponding response characteristic of the at least one resonator based on a plurality of orientations, and
   wherein the at least one resonator includes a plurality of thin dipoles positioned relative to the document, wherein at least one of the thin dipoles provides an energizing signal corresponding to the selected frequency, and wherein the wireless data receiver includes a transmitter that transmits an energizing signal to the at least one resonator.

16. The apparatus of claim 12 wherein the associated data output engine includes a print engine, wherein the machine-readable symbol is selected from an area symbology, wherein the symbol stores response characteristic information for a selected frequency, and wherein the at least one resonator provides an energizing signal corresponding to the selected frequency.

17. The apparatus of claim 12, further comprising a keyboard and a display device coupled to the processor, wherein the keyboard receives user input and the display device outputs data.

18. The apparatus of claim 12 wherein the associated data carrier includes a magnetically encoded portion secured to the target, wherein the magnetically encoded portion stores response characteristic information for a selected frequency, wherein the at least one resonator provides an energizing signal corresponding to the selected frequency, and wherein the associated data output engine is a magnetic code encoder for encoding the magnetically encoded portion.

19. An article of manufacture comprising:
   a substrate;
   at least one resonator positioned relative to the substrate, wherein the at least one resonator emits a data signal at a selected frequency based on a wirelessly received energizing signal, wherein the emitted data signal has corresponding response characteristics based on a plurality of orientations, relative to the at least one resonator, of the wirelessly received energizing signal; and
   an associated data carrier at a selected position on the substrate and including a machine-readable symbol for being read by a two-dimensional image capture device, wherein the associated data carrier stores automatically-readable information corresponding to the response characteristics of the at least one resonator based on the plurality of orientations of the received energizing signal.

20. The article of manufacture of claim 19 wherein the substrate includes a document, wherein the machine-readable symbol is positioned at a selected orientation on the document, wherein the symbol encodes data in two perpendicular dimensions, wherein the symbol stores phase and amplitude response characteristic information for at least one selected frequency, wherein the at least one resonator includes a plurality of thin dipoles positioned relative to the document, and wherein at least one of the thin dipoles provides an energizing signal corresponding to the selected frequency.

21. The article of manufacture of claim 19 wherein the machine-readable symbol is selected from an area symbology, wherein the symbol stores response characteristic information for a selected frequency, and wherein the at least one resonator provides an energizing signal corresponding to the selected frequency.

22. The article of manufacture of claim 19 wherein the associated data carrier includes a magnetically encoded portion secured to the substrate, wherein the magnetically encoded portion stores response characteristic information for a selected frequency, and wherein the at least one resonator provides an energizing signal corresponding to the selected frequency.

23. The article of manufacture of claim 19 wherein the substrate, at least one resonator and at least one associate data carrier form a lottery ticket.

24. The article of manufacture of claim 19 wherein the substrate, at least one resonator and at least one associate data carrier form a financial instrument.

25. The article of manufacture of claim 19 wherein the substrate, at least one resonator and at least one associate data carrier form an personal identification document.

26. The article of manufacture of claim 19 wherein the substrate, at least one resonator and at least one associate data carrier form a ticket for transportation of for an entertainment event.

* * * * *